(12) United States Patent
Walker (10) Patent No.: US 11,980,176 B2
(45) Date of Patent: May 14, 2024

(54) PRESSURE DISPERSING APPARATUS AND METHOD OF USING SAME FOR FISHING ROD

(71) Applicant: Russell D Walker, Cape Coral, FL (US)

(72) Inventor: Russell D Walker, Cape Coral, FL (US)

(73) Assignee: HIDDEN T PROPERTIES LLC, Cape Coral, FL (US)

( * ) Notice: Subject to any disclaimer, the term of this patent is extended or adjusted under 35 U.S.C. 154(b) by 0 days.

(21) Appl. No.: 18/142,778

(22) Filed: May 3, 2023

(65) Prior Publication Data

US 2023/0354792 A1    Nov. 9, 2023

Related U.S. Application Data

(60) Provisional application No. 63/473,125, filed on May 4, 2022.

(51) Int. Cl.
*A01K 87/00* (2006.01)
*A01K 87/08* (2006.01)

(52) U.S. Cl.
CPC ............ *A01K 87/08* (2013.01); *A01K 87/008* (2022.02)

(58) Field of Classification Search
CPC .... A01K 87/00; A01K 87/002; A01K 87/005; A01K 87/02; A01K 87/025; A01K 87/04;
(Continued)

(56) References Cited

U.S. PATENT DOCUMENTS 252,008 A    1/1882  Andrews
1,566,232 A  * 12/1925  Schreiter ............... B05B 15/622
                                                404/136
(Continued)

FOREIGN PATENT DOCUMENTS

CN    110089501 A  *  8/2019
GB    2193423        2/1988
(Continued)

OTHER PUBLICATIONS

U Build Rods; Installing the Rod Handle—RodKits Lesson 3, May 14, 2019, Youtube Video https://www.youtube.com/watch?v=dvme4OvesGQ&t=1s (Year: 2019).*

(Continued)

*Primary Examiner* — Darren W Ark
*Assistant Examiner* — Katelyn T Truong
(74) *Attorney, Agent, or Firm* — Knechtel, Demeur & Samlan (57) ABSTRACT

An improved fishing rod butt component that has only one non-rusting, self-latching, moving part which can rotate smoothly from a self-locking literal alignment with the fishing rod into a non-injurious, moveable within ninety (90) degrees to a lower barrel T shaped body (e.g., requiring no positioning pins, levers, potentially rusting springs, screws, wooden covers, wedges or retainers) to be held against the body of the fisherman or user during a fish fight. The fishing rod butt can be retro-fitted as an improvement to an existing or pre-owned fishing rod that needs additional comfort and stability also includes a gimbal butt apparatus.

13 Claims, 10 Drawing Sheets

(58) Field of Classification Search
CPC .... A01K 87/06; A01K 87/085; A01K 87/008; A01K 87/08; A01K 87/007; A01K 97/10
USPC .............. 43/18.1 R, 21.2, 23, 25; 135/74, 2; 16/438, 426, 427, 429, 430; 94/53.5; 42/94, 72, 73
See application file for complete search history.

(56) References Cited

U.S. PATENT DOCUMENTS

| | | | |
|---|---|---|---|
| 1,893,396 A | 1/1933 | Bullough | |
| 2,504,881 A | 10/1947 | Carlson | |
| 2,526,293 A * | 10/1950 | Stark | A01K 87/08 43/23 |
| 2,564,065 A * | 8/1951 | Jaden | A01K 97/10 248/533 |
| 2,724,569 A * | 11/1955 | Licata | A01K 97/10 403/53 |
| 2,851,812 A | 9/1958 | Beck | |
| 2,954,909 A | 10/1960 | Miller | |
| 2,995,855 A | 8/1961 | Bell | |
| 3,185,146 A * | 5/1965 | Norbert | A61B 9/00 81/19 |
| 3,287,844 A | 11/1966 | Hoxter | |
| 3,348,328 A | 10/1967 | Earl | |
| 3,410,016 A | 11/1968 | Arsenault | |
| 3,509,627 A | 5/1970 | Gilbert | |
| 3,885,721 A | 5/1975 | Vanus | |
| 4,077,150 A | 3/1978 | Barnes | |
| 4,429,918 A | 2/1984 | Alsup | |
| 4,498,257 A | 2/1985 | Jekel | |
| 4,653,215 A | 3/1987 | Strader | |
| 4,720,932 A | 1/1988 | Bovina | |
| 4,748,762 A * | 6/1988 | Campbell | A01K 97/10 248/533 |
| 4,858,365 A | 8/1989 | Struntz | |
| 5,063,628 A | 11/1991 | Campbell | |
| 5,165,673 A | 11/1992 | Newton | |
| 5,307,788 A | 5/1994 | Peck | |
| 5,318,004 A | 6/1994 | Peck | |
| 5,369,904 A | 12/1994 | Vogts | |
| 5,557,875 A | 9/1996 | Testa | |
| 5,564,217 A | 10/1996 | Riedell | |
| 5,660,344 A | 8/1997 | Testa | |
| 5,697,184 A | 12/1997 | Heller | |
| 5,704,129 A | 1/1998 | Glesser | |
| 5,781,998 A | 7/1998 | Stamper | |
| 5,823,969 A * | 10/1998 | Christy | A61B 5/4824 600/587 |
| 6,058,920 A | 5/2000 | Tentler | |
| 6,089,652 A | 7/2000 | Miller, Sr. | |
| 6,148,558 A | 11/2000 | Ono | |
| 6,341,756 B1 | 1/2002 | Morris | |
| 6,381,897 B1 * | 5/2002 | Walsh | A01K 97/10 43/21.2 |
| 6,460,285 B2 | 10/2002 | Collins | |
| 6,557,292 B1 | 5/2003 | Howard | |
| 7,454,862 B2 | 11/2008 | Markley | |
| 8,413,366 B2 | 4/2013 | Malcarne | |
| 10,757,926 B2 | 9/2020 | Malcarne | |
| 11,229,195 B2 | 1/2022 | Wakefield | |
| 2002/0073601 A1 | 6/2002 | DeSorcy | |
| 2006/0201049 A1 | 9/2006 | Nyland | |
| 2006/0230669 A1 | 10/2006 | Markley | |
| 2007/0017143 A1 | 1/2007 | Brown | |
| 2007/0084104 A1 | 4/2007 | Demetris | |
| 2016/0121493 A1 * | 5/2016 | Ikoma | B26B 1/042 30/161 |
| 2017/0181418 A1 | 6/2017 | Teelow | |
| 2017/0347637 A1 | 12/2017 | Constantine | |
| 2018/0027787 A1 * | 2/2018 | Free | A01K 87/007 |
| 2018/0290032 A1 * | 10/2018 | Solheim | A63B 53/14 |
| 2021/0161116 A1 | 6/2021 | Malcarne | |
| 2021/0235678 A1 | 8/2021 | Thiele | |
| 2021/0282382 A1 | 9/2021 | Malcarne | |

FOREIGN PATENT DOCUMENTS

| | | | |
|---|---|---|---|
| GB | 2413252 A | 10/2005 | |
| JP | 2006/288345 | 10/2006 | |
| JP | 2010029357 | 2/2010 | |
| JP | 5700281 | 4/2015 | |
| JP | 6579988 | 9/2019 | |
| JP | 2019154270 | 9/2019 | |
| WO | WO-1988001029 A1 | 1/1988 | |
| WO | WO-03022044 A1 * | 3/2003 | ............ A01K 87/08 |
| WO | WO-2020047591 A1 * | 3/2020 | |

OTHER PUBLICATIONS

Translation of CN-110089501-A (Year: 2019).*

* cited by examiner

PRESSURE DISPERSING APPARATUS AND METHOD OF USING SAME FOR FISHING ROD

I. CROSS-REFERENCE TO RELATED APPLICATION

This patent application is a non-provisional application claiming priority from U.S. Provisional Patent Application Ser. No. 63/473,125, entitled "Comfort Rod Knuckle Joint Quick Snap Fishing Rod Handle Pressure Dispersing Apparatus Component", filed on May 4, 2022, and is fully incorporated herein by reference.

II. FIELD OF THE INVENTION

The present invention relates to devices for use in fishing, and more particularly to a unique and improved fishing rod butt component created and engineered to eliminate or substantially reduce pain generated by the blunt rod butt of a typical fishing rod to the fisherman or user during a fish fight.

II. DESCRIPTION OF THE PRIOR ART

During fishing and, especially during large-game fishing, a fisherman will hold the fishing rod butt against their body (e.g., normally abdomen) during a fish fight. Due to the fishing rod butt being held against the abdomen in the struggle of the fish fight, the fisherman will feel the pressure and discomfort that is generated in the small, isolated area of their abdomen (e.g., matching the size of the fishing rod butt poking or penetrating into this area) for the entirety of this fish fight or battles while reeling in a fish and, often, may result in bruising, pain, or injury.

Previous attempts at solving this fishing rod butt issue has resulted in devices that have failed, were expensive and much too complicated, and/or contained too many destructible parts such as positioning pins, levers, potentially rusting springs, screws, wooden covers, wedges or retainers, that may or may not survive extended service requirements. One such example is U.S. Pat. No. 4,498,257 entitled "Fishing Rod Butt" which discloses a fishing rod butt that would help distribute pressure over a larger area of the fisherman's or user's abdomen but requires these various difficult mechanisms for use including locking the pivoting body support (e.g., such as the use of pressurized springs).

Other prior art devices, for example, included unattached T handles, gimbal belts, cumbersome rubber attached gimbal pads, rubber attachable cushions/stoppers and all manner of other detached apparatuses. All of which presented a storage problem or could easily be misplaced, soiled, lost in their entirety, simply blow out of the boat during travel or easily fall off the fishing rod while in use. Also, due to unaccommodating sizes, all of the aforementioned devices must also be removed before they can be transported in an appropriate rod rack on the boat.

In all of this time, despite these various devices disclosed, their failures or inability to solve the problem is evident by their absence in the current day retail fishing equipment market leaving this issue remaining unresolved.

Applicant, on the other hand, has solved this problem by providing a unique and much improved fishing rod butt component to disperse the pressure of the fishing rod butt over a larger area of the fisherman's body, including, abdomen, thigh, elbow or underarm, thereby providing relief to the fisherman or user during a fish fight, and likewise perhaps lowering the risk of injury.

Thus, there is a need, therefore, and there has never been disclosed Applicant's pressure dispersing apparatus and method of using the same.

IV. SUMMARY OF THE INVENTION

The present invention is an improved fishing rod butt component that has only one non-rusting, self-latching, moving part which can rotate smoothly from a self-locking literal alignment with the fishing rod into a non-injurious, moveable within ninety (90) degrees to a lower barrel T shaped body (e.g., requiring no positioning pins, levers, potentially rusting springs, screws, wooden covers, wedges or retainers) to be held against the body of the fisherman or user during a fish fight. The fishing rod butt can be retrofitted as an improvement to an existing or pre-owned fishing rod that needs additional comfort and stability also includes a gimbal butt apparatus.

V. BRIEF DESCRIPTION OF THE DRAWINGS

The Description of the Preferred Embodiment will be better understood with reference to the following figures.

VI. DETAILED DESCRIPTION OF THE PREFERRED EMBODIMENT

While this invention is susceptible of embodiment in many different forms, there is shown in the drawings and described herein in detail specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters. It will be further understood that FIGS. 1-19 are merely schematic representations of the device and some of the components may have been distorted from their actual scale for pictorial clarity.

Figure 1:
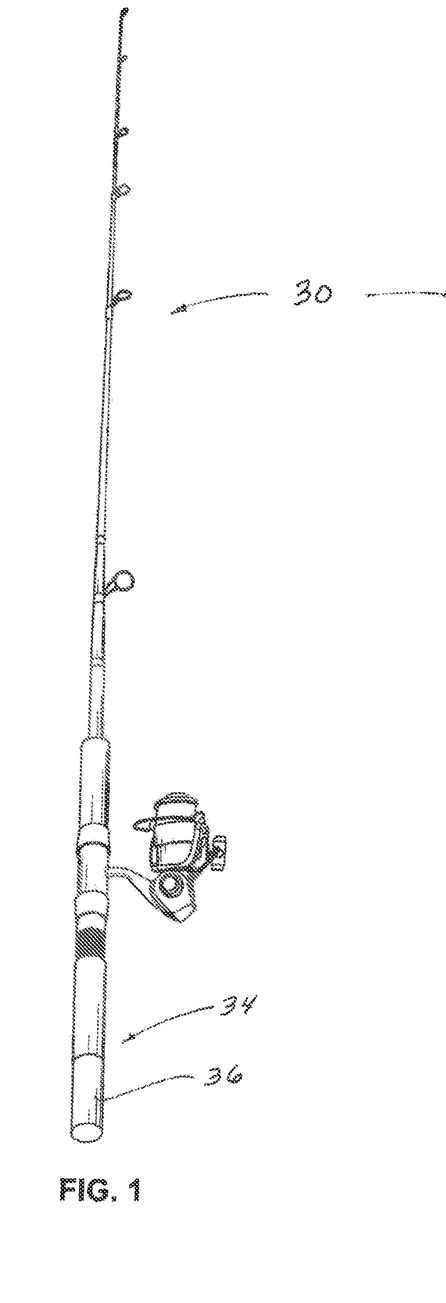
FIG. 1 is a front view of a fishing rod used in accordance with Applicant's present invention and device.
Figure 2:
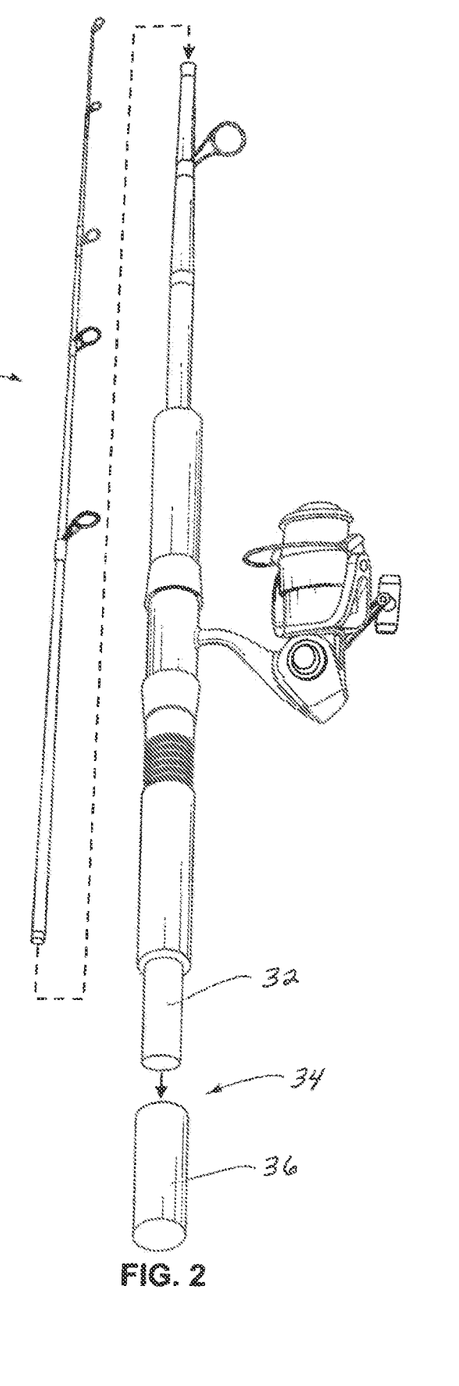
FIG. 2 is a front view of a fishing rod used in accordance with Applicant's present invention and, in particular, illustrating a portion of the fishing rod handle used in Applicant's present invention and for attaching to Applicant's inventive device.

In accordance with the present invention, and beginning with FIGS. 1 and 2, a fishing rod 30 is illustrated. Most conventional fishing rods used for deep sea and sport fishing (e.g., fresh and saltwater) are made of or include a handle body 34 with a handle butt 36 that is situated on a rod blank 32. Typically, the rod blank 32 is elongated and defines the distal end of the fishing rod 30, which is intended to be ultimately fitted within the handle butt 36 or rod butt cap.

Figures 3, 4A, 4B:
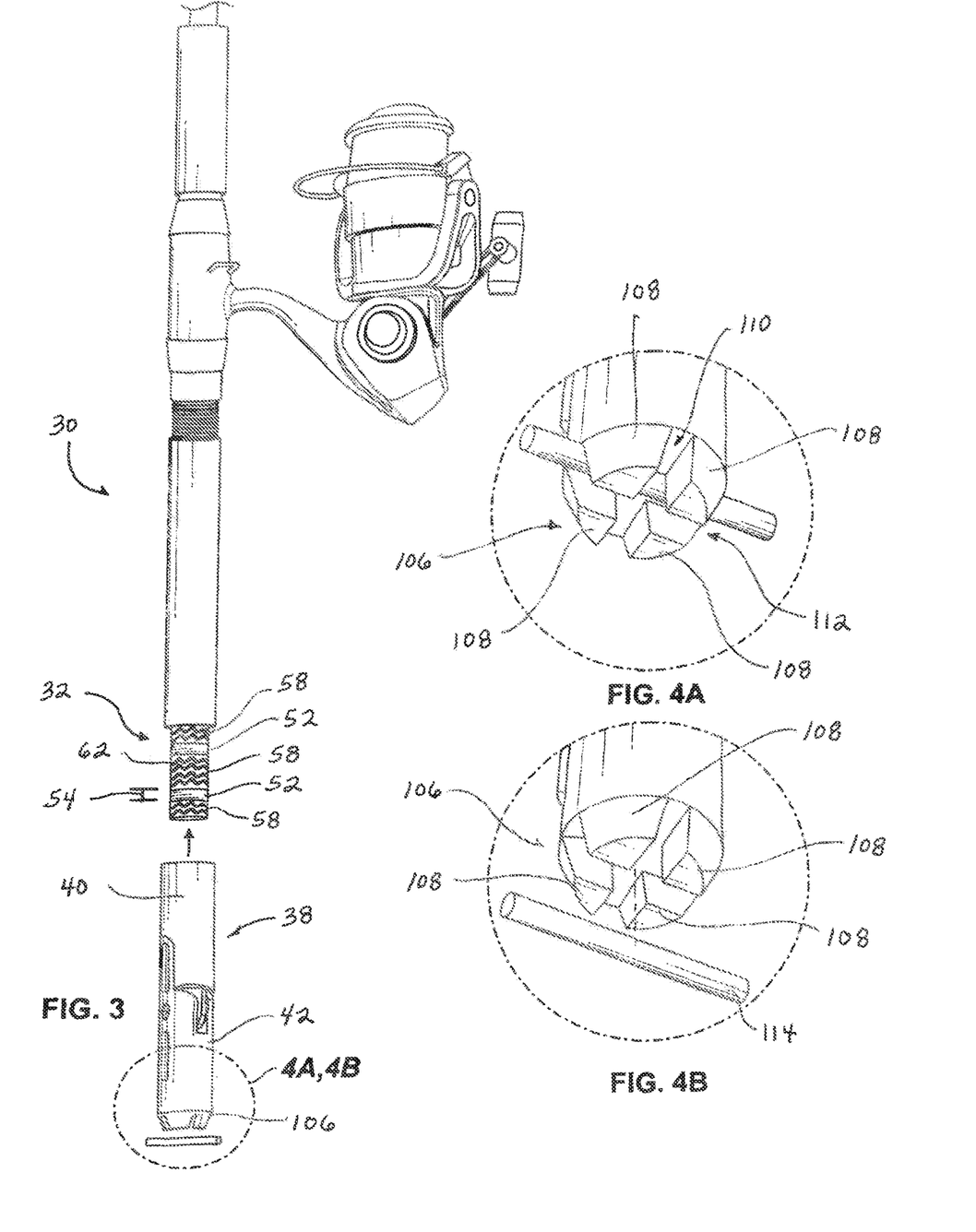
FIG. 3 is an exploded view of a fishing rod handle, with portions removed, for attachment to Applicant's inventive device.
FIG. 4A is a bottom perspective view of Applicant's device and, in particular illustrating the gimbal situated at the base of the base as releaseably fixed to a bar situated within a rod holder, with portions removed, on a boat.
FIG. 4B is an exploded view of the bottom perspective view of Applicant's device and, in particular illustrating the gimbal situated at the base of the base as releaseably fixed to a bar situated within a rod holder, with portions removed, on a boat.

As illustrated in FIG. 3, Applicant's pressure dispersing apparatus or fishing rod butt component (hereinafter referred to as "device 38") can be retro-fitted as an improvement to an existing or pre-owned fishing rod 30. In the preferred embodiment, and referencing FIGS. 3, 14-17, the means for fixedly securing the device 38 to the fishing rod 30 is more clearly illustrated.

The device 38 is an elongated and generally cylindrical body having two parts: a tube 40 and a foot 42. The tube 40 provides a receptacle hole 44 having a length 46, a width 48, and diameter 50 (see FIG. 9) to accommodate the rod blank 32 in the manner described herein. When securing the device 38 to the fishing rod 30, the rod blank 32 is inserted into the receptacle hole 44 of the tube 40.

First, prior to inserting, masking tape or taped arbor 52, or any other means known to one skilled in the art, is wrapped around the exterior of the rod blank 32. In the preferred embodiment, the masking tape 52 is of a masking tape width 54 (see FIG. 3, 17) that is smaller than the length 56 of the rod blank 32 (see FIG. 17) and further that the masking tape has a width 54 that is small enough to allow preferably a plurality of sections 59 (see FIG. 17) of the masking tape 52 to be wrapped around the exterior of the rod blank 32 and which are separated or at different locations to also create in between those plurality of sections 59 a plurality of annulus sections 58 (see FIG. 16) as well. Alternatively, more or less of the sections 59 of the masking tape 52 may be wrapped around the exterior of the rod blank 32 creating more or less of the annulus sections 58 provided that the device 38 is sufficiently secured to the fishing rod 30 to be used in the manner as described herein. In each of the plurality of sections 59 of the masking tape 52 that are wrapped around the exterior of the rod blank 32, the thickness 60 of each of the plurality of sections 59 of the masking tape 52 is preferably as close as possible, or substantially, the same size as the width 48 (see FIG. 14) and diameter 50 (see FIG. 9) of the tube 40. In this manner, each of the plurality of sections 59 of the masking tape 52 will frictionally engage within the receptacle hole 44 of the tube 40 upon insertion.

Second, a polymer, filler, or other adhesive material 62, such as for example, an epoxy, or any other material known to one skilled in the art, is inserted into the bottom 64 (see FIGS. 16, 17) of the receptacle hole 44 to fill the open space 66 between the rod blank 32 and the bottom 64 of the receptacle hole 44. The adhesive material 62 is then also wrapped in and around each of the plurality of annulus sections 58.

Figure 16:
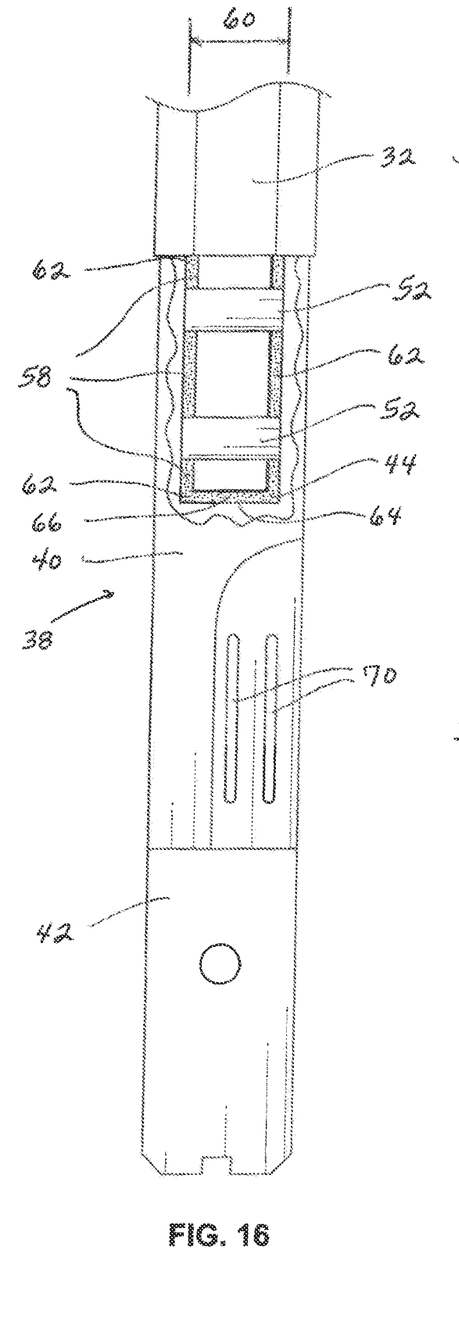
FIG. 16 is a side view, and partial cutaway into, of Applicant's device and, in particular, illustrating the receptacle hole having received the rod blank with the masked tape and annulus sections used to accomplish the same.
Figure 17:
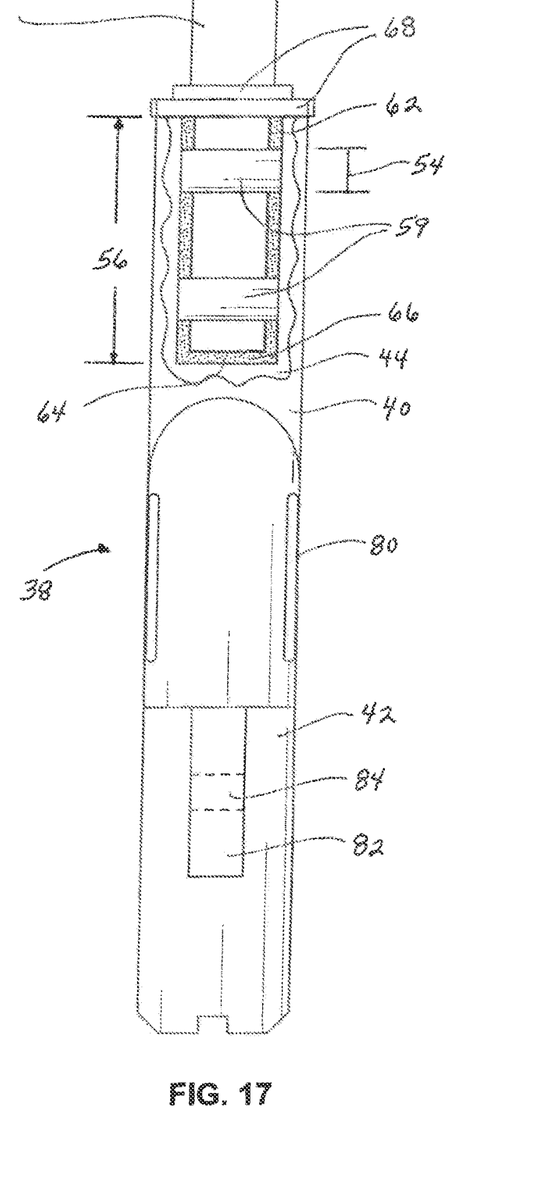
FIG. 17 is another side view, and partial cutaway into, of Applicant's device and, in particular, illustrating the receptacle hole having received the rod blank with the masked tape and annulus sections used to accomplish the same.

Third, the rod blank 32 with the masking tape 52 and the adhesive material 62 wrapped around each of the plurality of annulus sections 58, as illustrated in FIG. 3, are then inserted into the receptacle hole 44 of the tube 40, as illustrated in FIGS. 16 and 17.

Fourth, when the adhesive material 62 situated in each of the plurality of annulus sections 58 cures or hardens, it forms a strong bond or seal between the rod blank 32 and the tube 40. And, this strong bond in combination with the frictional engagement of the masking tape 52 within the receptacle hole 44, fixedly secures the device 38 to the fishing rod 30. Alternatively, it is contemplated that any combination of the masking tape 52, annulus sections 58, or the adhesive material 62 may be used individually or together to fixedly secure the device 38 to the fishing rod 30.

Lastly, stage reducer washers 68 (see FIG. 17) may be used to additionally secure the tube 40 to the fishing rod 30. In this manner, the stage reducer washers 68 are situated around the exterior of the rod blank 32 and pressed against the top of tube 40 adjacent to the receptacle hole 44. The adhesive material 62 may be used in between the stage reducer washers 68 to further form a strong bond or seal between the stage reducer washers 68, rod blank 32, and the tube 40. Depending upon the size of the rod blank 32 a plurality of stage reducer washers 68 (e.g., as shown in a stepping or stacked manner) may be desired or needed.

Figures 5, 6, 7:
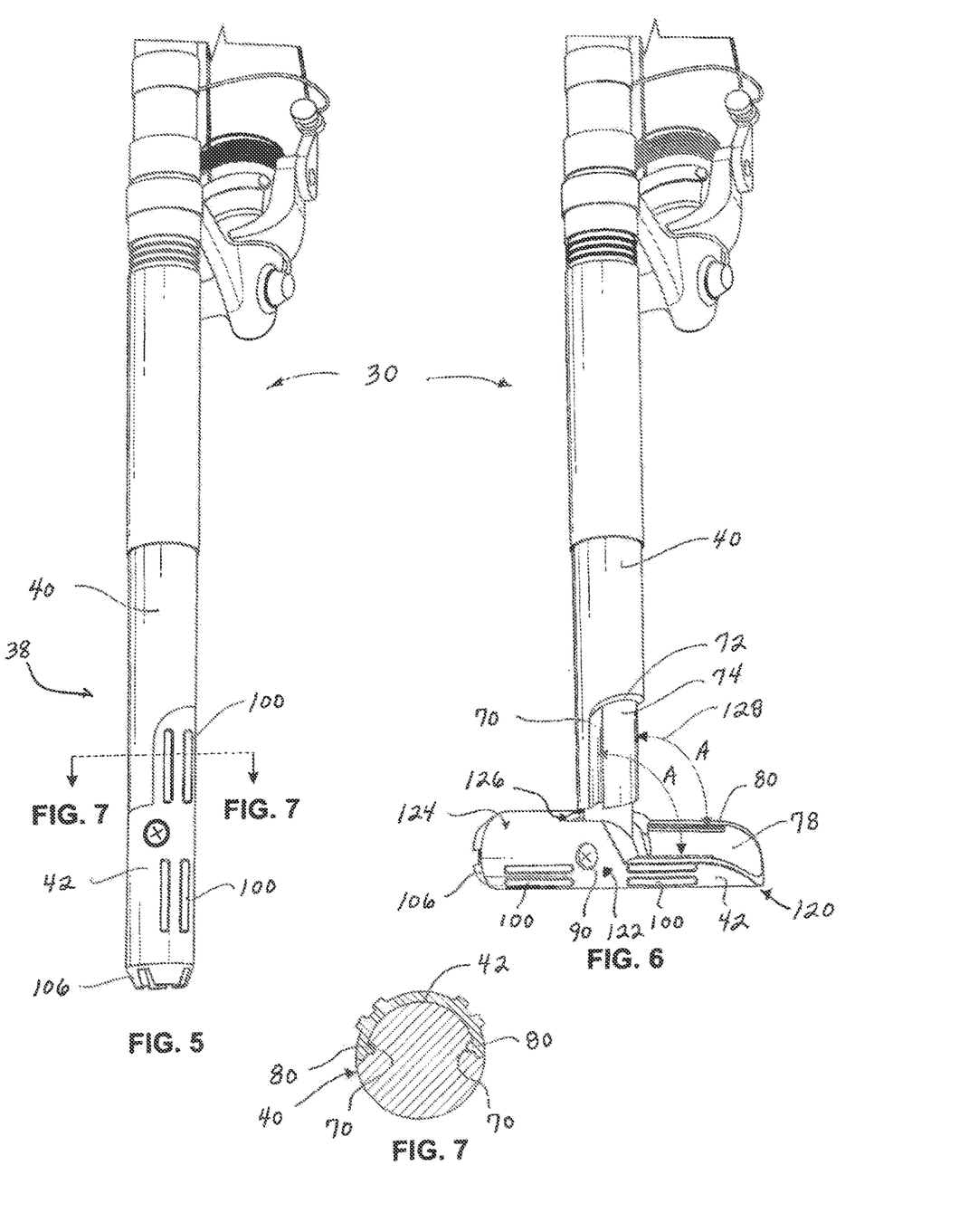
FIG. 5 is a perspective view of Applicant's device as fixedly secured to the fishing rod handle, with portions removed, and, in particular, illustrating the device in the literal orientation to the tube and fishing rod handle.
FIG. 6 is a perspective view of Applicant's device as fixedly secured to the fishing rod handle, with portions removed, and, in particular, illustrating the foot in the perpendicular orientation to the tube and fishing rod handle.
FIG. 7 is a cross-sectional view, taken along Line 7-7 of FIG. 5, of Applicant's device and, in particular, illustrating the frictional engagement of the concave surface of the foot to the convex surface of the tube of Applicant's device.

Turning to FIGS. 5-11 more clearly illustrates the device 38. Once retro-fitted as an improvement to an existing or pre-owned fishing rod 30 or made as part of the fishing rod 30, the device 38, during periods of non-use, is in a stream-aligned, linear alignment with the fishing rod 30, as illustrated in FIG. 5; or during periods of use, is in perpendicular alignment with the fishing rod 30, as illustrated in FIG. 6.

In the preferred embodiment, and as further illustrated in FIG. 6, the tube 40, is further provided with a partial neck 72 that reduces to a convex surface 74 situated on a portion of the tube 40. In this manner, the diameter of the tube 40 is also reduced from diameter 50 to a smaller diameter 76 (see FIG. 9) to facilitate, as described in more detail below, the interaction or engagement of the tube 40 to the foot 42. Situated on the exterior sides of the convex surface 74 are a plurality of elongated indentations, lock cavities, alignment or receiving slots (hereinafter referred to as "plurality of receiving slots 70").

In the preferred embodiment, the foot 42 is an elongated and generally cylindrical body having a concave surface 78 and a plurality of elongated ridges, locking protrusions, or exterior ridges extending outwardly from the concave surface 78 (hereinafter referred to as "plurality of exterior ridges 80"). As described in more detail herein, the plurality of exterior ridges 80 of the foot 42 are frictionally received or snapped into the corresponding plurality of receiving slots 70 in the tube 40 for releaseably securing the foot 42 to the tube 40, as illustrated in FIGS. 6 and 7.

Figure 10:
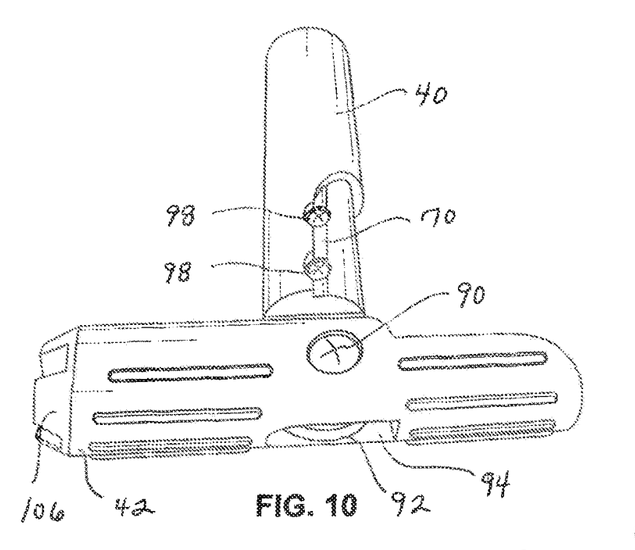
FIG. 10 is a perspective view of Applicant's device in the perpendicular orientation and, in particular, illustrating the FIG. 11 is an exploded view of Applicant's device in the perpendicular orientation to the fishing rod handle and, in particular, illustrating the foot in the perpendicular orientation to the tube of the device.
Figure 11:
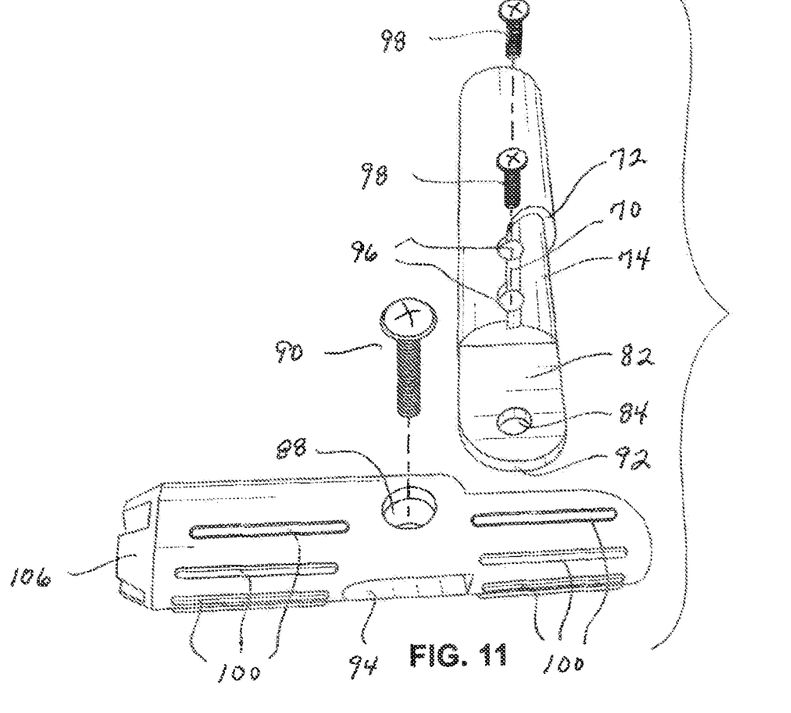

As illustrated in FIGS. 8-11, the means for the pivotal attachment and engagement of the tube 40 to the foot 42 is also more clearly illustrated. In the preferred embodiment, the tube 40 also provides a tang 82 that extends outwardly from the tube 40 and is disposed with a tang hole 84. In the preferred embodiment, the tang 82 is integrated into, or part of, the tube 40. In an alternate embodiment, as illustrated in FIGS. 10 and 11, the tube 40 may be additionally provided with a plurality of securing holes 96 that extend through both the tube 40 and the body (not illustrated) of the tang 40 extending within the tube 40 and a plurality of threaded or rounded hex head screws 98 for inserting into the corresponding plurality of securing holes 96, or any other means known to one skilled in the art, for securing the tang 82 within the tube 40.

The foot 42 is also provided with a cutout 86 (see FIG. 9) and reciprocal holes 88. In this manner, the tang 82 of the tube 40 is inserted into the cutout 86 of the foot 42 until the tang hole 84 becomes aligned with the reciprocal holes 88 in the foot 42. When this occurs, securing means 90 such as a barrel screw, or any other means known to one skilled in the art, is used to fixedly secure the tube 40 to the foot 42 but also allow the foot 42 to be pivotally moved in relation to the tube 40.

Figures 8, 9:
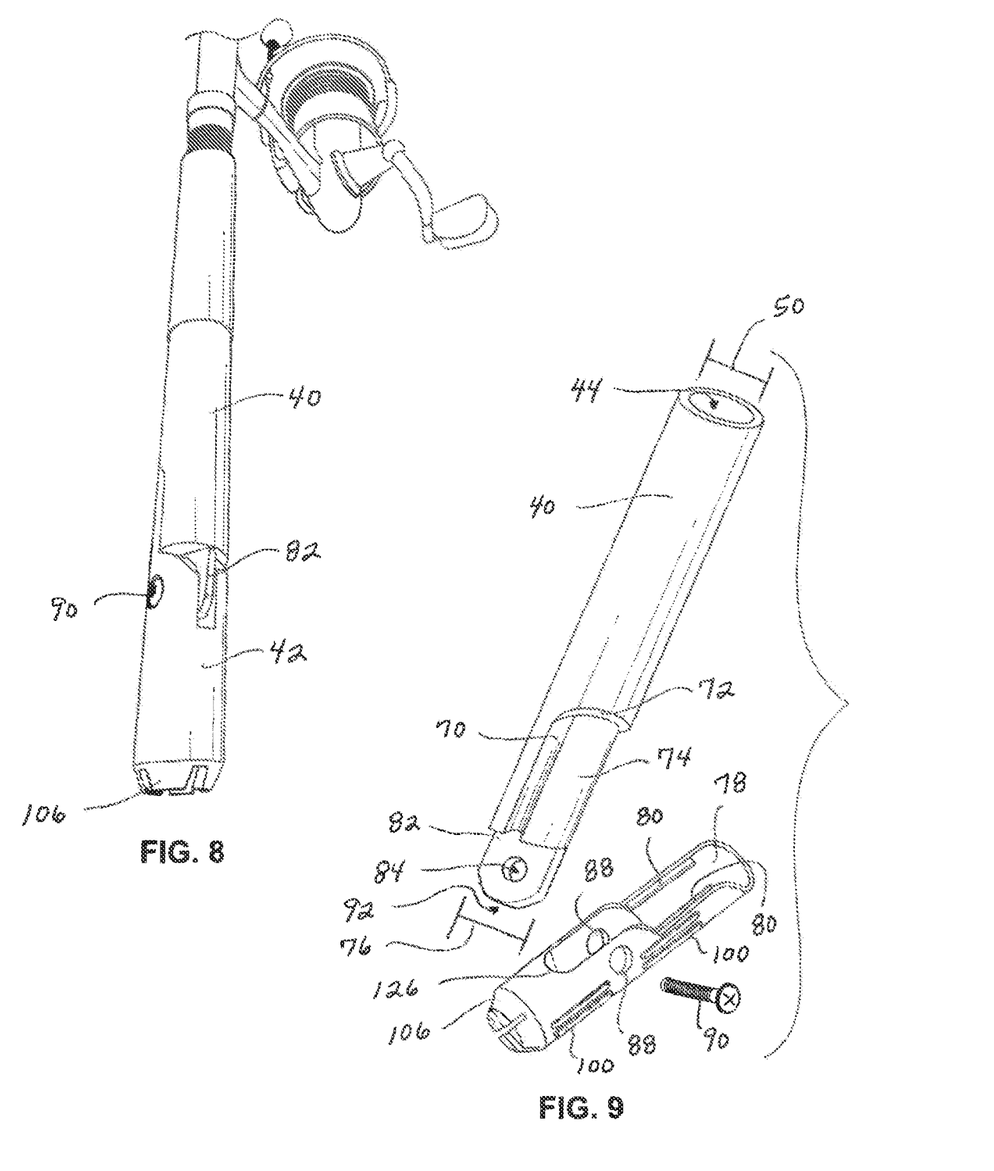
FIG. 8 is a back side perspective view of Applicant's device as fixedly secured to the fishing rod handle, with portions removed, and, in particular, illustrating tang of the tube in relation to the cutout in the foot.
FIG. 9 is an exploded perspective view of Applicant's device and, in particular, illustrating the attachment and pivotal or rotational engagement of the foot in relation to the tube of Applicant's device.

Additionally, the tang 82, as illustrated in FIGS. 9-11, has a tang end 92 that is circular in shape and the foot 42 has a notch 94 that allows the tang end 92 to correspondingly and freely pivot or rotate within the notch 94 as the foot 42 is pivoted or rotated in relation to the tube 40.

Figures 12, 13:
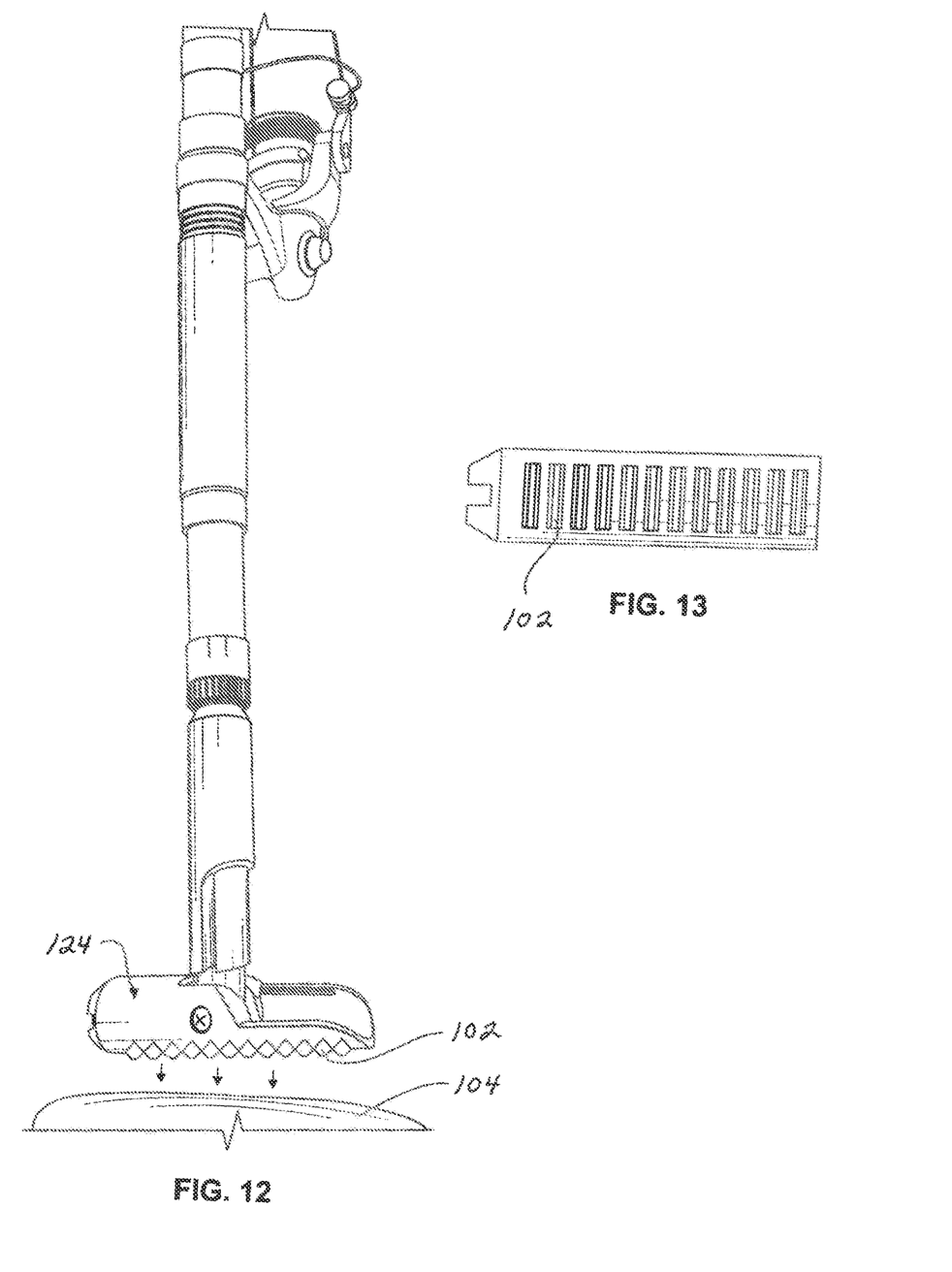
FIG. 12 is a perspective view of Applicant's device as fixedly secured to the fishing rod handle, with portions removed, and, in particular, illustrating the device in the foot having a frictional surface prior to engagement with a fisherman or user during use.
FIG. 13 is a bottom view of Applicant's device and, in particular, illustrating an alternate embodiment of the frictional surface on the foot.
Figure 14:
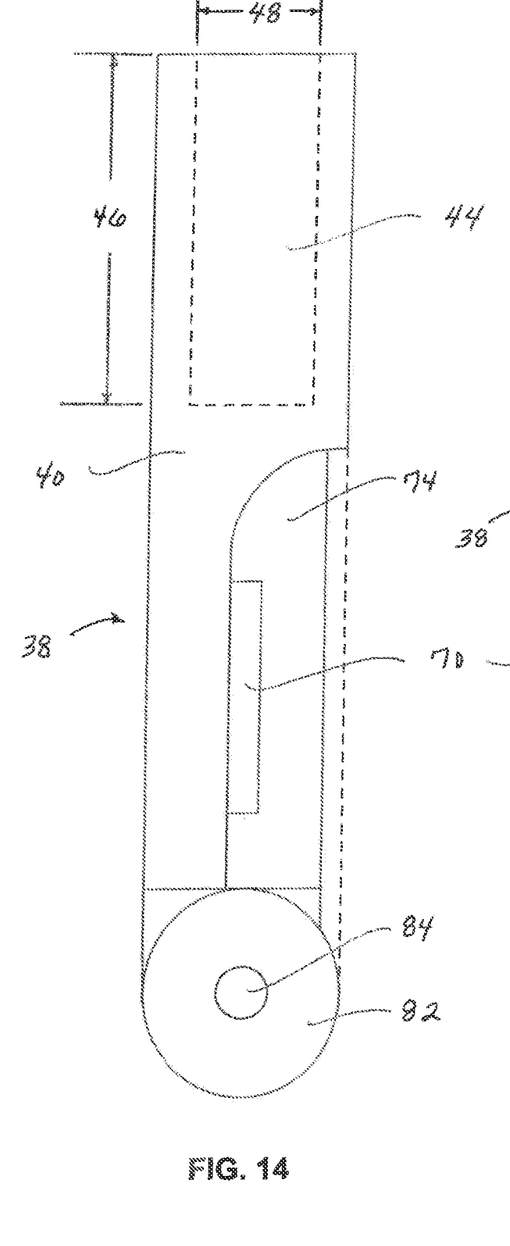
FIG. 14 is a side view, and partial cutaway into, of Applicant's device and, in particular, illustrating the receptacle hole for receiving the rod blank.
Figure 15:
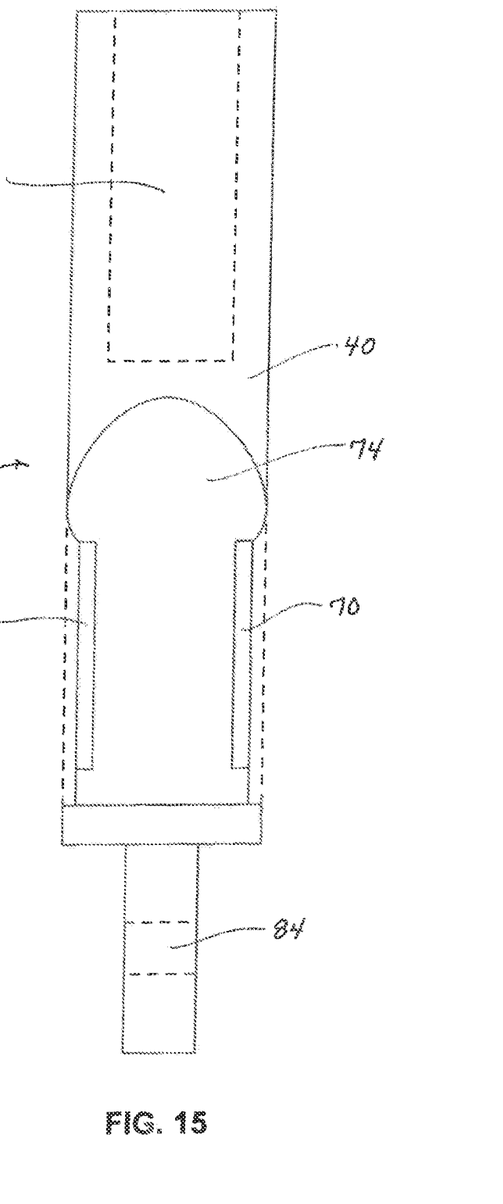
FIG. 15 is another side view, and partial cutaway into, of Applicant's device and, in particular, illustrating the receptacle hole for receiving the rod blank.
Figure 18A:
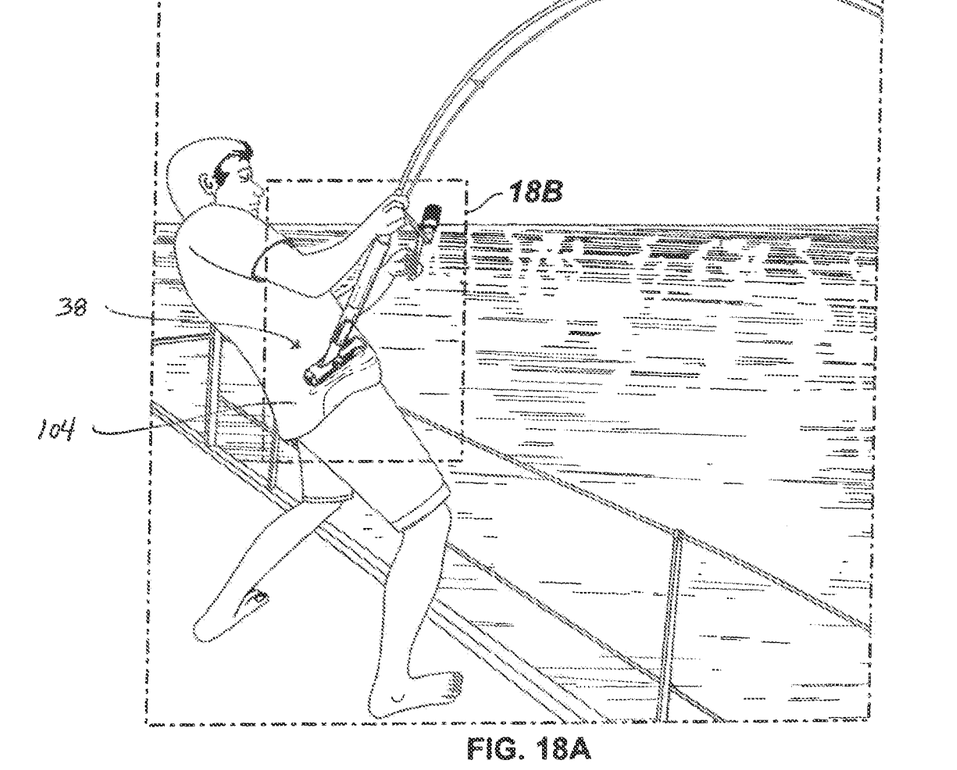
FIG. 18A is a perspective view of the fisherman or user using the fishing rod with Applicant's device laying against or across the fisherman's or user's body, including abdomen, thigh, elbow or underarm, to thereby disperse or defuse pressure generated during a fish fight.
Figure 18B:
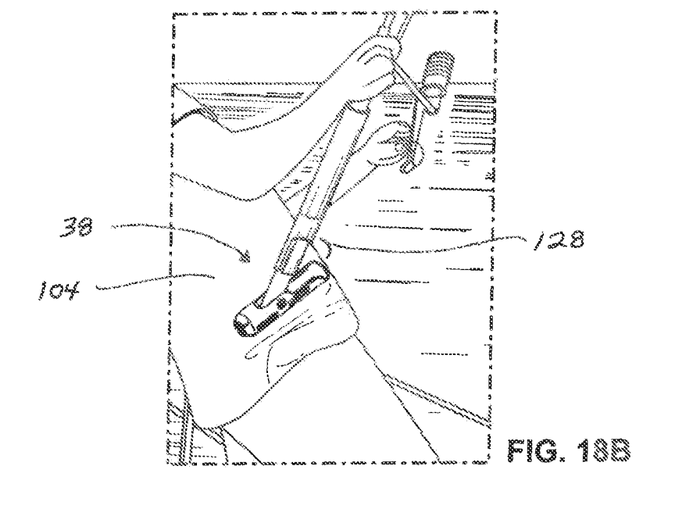
FIG. 18B is a perspective view of FIG. 18A the fisherman or user using the fishing rod with Applicant's device laying against or across the fisherman's or user's body, including abdomen, thigh, elbow or underarm, at a different angle to thereby disperse or defuse pressure generated during a fish fight.

Situated on the exterior of the foot 42 are also a plurality of elongated bars 100 extending lengthwise along the foot 42. In the preferred embodiment, the plurality of elongated bars 100 are used, as described in more detail below, for when the foot 42 engages the fisherman's body 104, including, abdomen, thigh, elbow or underarm, to create a frictional surface to thereby assist in retaining the device 38 in engagement with the fisherman or user during a fish fight, as illustrated in FIGS. 18A and 18B. Alternatively, as illustrated in FIGS. 12 and 13, it is contemplated that a plurality of shortened bars 102 extending perpendicular to the length of the foot 42 may also be used or any other means known to one skilled in the art for creating this frictional surface.

Figure 19A:
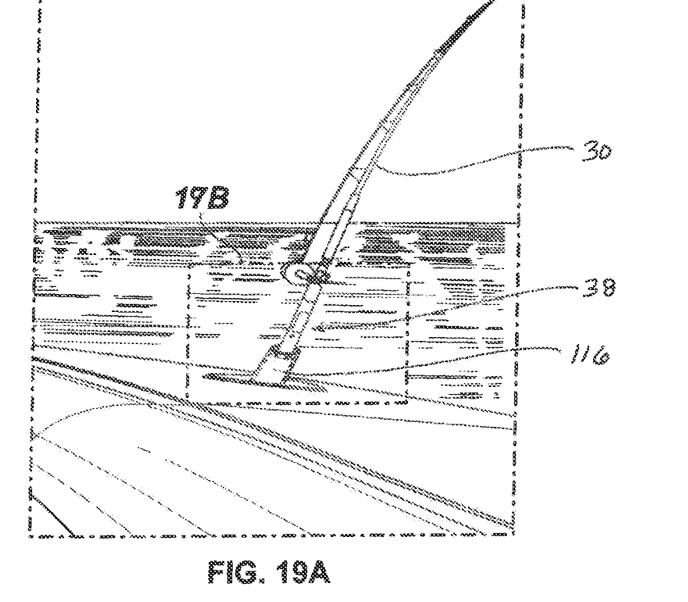
FIG. 19A is a perspective view of the fishing rod with Applicant's device using the gimbal in a rod holder of a boat during a fish fight.
Figure 19B:
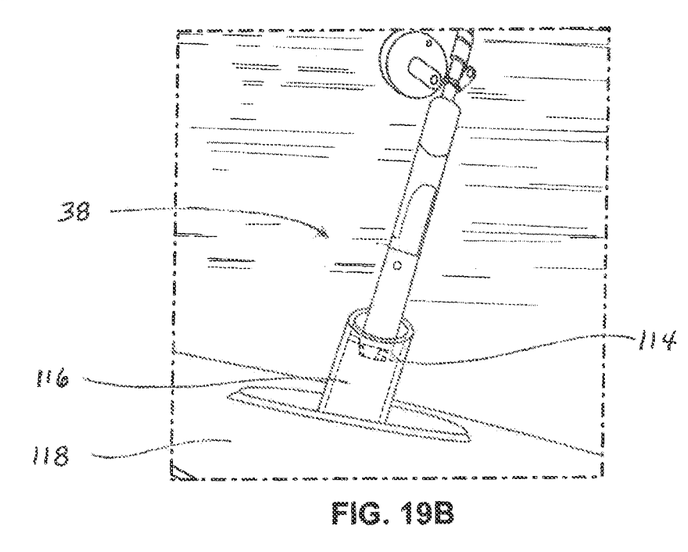
FIG. 19B is a perspective view of FIG. 19A of the fishing rod with Applicant's device using the gimbal in a rod holder of a boat during a fish fight.

A gimbal 106 (see FIG. 4A, B) is situated at the end of the foot 42. In the preferred embodiment, the gimbal 106 has a plurality of extensions 108 that create a fixed recess 110 and 112 between them to receive a bar 114 in a rod holder 116 on a boat 118, as illustrated in FIGS. 19A and 19B. Recess 110 is situated at a ninety (90) degree angle to recess 112. Alternatively, the recess 110 and 112 could be situated at any other angle provided that the gimbal 106 is used in the same manner as described herein.

In use, as mentioned, the device 38 is built in, used or accommodated on or installed on a fishing rod 30 which includes such as, for example, a casting fishing rod or a spinning fishing rod, or as an addition to either. When in non-use, the device 38 remains in linear alignment with the fishing rod 30, as illustrated in FIG. 5, and useable just like any other handle for the fishing rod 30. When a fish becomes hooked to the fishing rod 30 and a fight or battles to reel in the fish ensues, the foot 42 of the device 38, during this period of use, can be rotated or pivoted into a perpendicular alignment with the fishing rod 30. By pulling on or turning the engagement end 120 of the foot 42, this releases or unclicks the plurality of exterior ridges 80 of the foot 42 from their frictionally engagement within the corresponding plurality of receiving slots 70 in the tube 40 and thereby releases this engagement end 120 of the foot 42 from the tube 40. In this manner, the engagement end 120 of the foot 42 pivots or rotates up to ninety (90) degrees angle 128 about pivot point 122, along Arrow A, as illustrated in FIG. 6, in relation to and in a direction away from the tube 40 into a perpendicular alignment with the fishing rod 30. In the preferred embodiment, the butt end 124 (see FIG. 6) of the foot 42 providing a stop 126 engages the tube 40 to prevent the foot 42 from pivoting or rotating more than ninety (90) degrees. As a result, with the pivotal or rotational capability of the foot 42 in relation to the tube 40 and this stop 126, it allows the fisherman or user the flexibility to use the foot 42 at whichever angle 128 in relation to the tube 40, and change, or continuously change, this angle 128, to that which is most desired by the fisherman or user during use.

In a non-limiting example, although the engagement end 120 of the foot 42 is shown pivoting or rotating to the right from the fishing rod 30, the device 38 could be attached to the fishing rod 30 in the reverse direction to accommodate a pivot or rotation to the left from the fishing rod 30, depending upon whether the fishing rod 30, for example, is a casting fishing rod or spinning fishing rod. In this manner, the foot 42 forms, at the bottom of the fishing rod 30, an opposing, wide right or perpendicular angle T-shaped brace that lays against or crosses the fisherman's or user's body, including abdomen, thigh, elbow or underarm, to thereby disperse or defuse pressure generated from the fish fight.

Once the fish fight is completed or the need for pressure relief is over, the engagement end 120 of the foot 42 is pivoted or rotated up to ninety (90) degrees about pivot point 122 in the opposite direction, along Arrow A, as illustrated in FIG. 6, in relation to and in the direction toward the tube 40 until the plurality of exterior ridges 80 of the foot 42 are snapped or clicked back into frictional engagement within the corresponding plurality of receiving slots 70 in the tube 40. In this manner, the concave surface 78 of the foot becomes flush with the convex surface 74 of the tube 40, as illustrated in FIG. 7, and thereby re-engages the engagement end 120 of the foot 42 to the tube 40 and back into a linear alignment with the fishing rod 30, ready for another cast or easily stored in any given boat or land-based rod rack.

Based on the foregoing, Applicant's device 38 provides at least the following advantages:
(a) a new rotating, self-locking pressure relief system centered around a circular base pedestal tang, which, by engagement of the protective pressure dispersing apparatus is actuated in or out with one quick 90-degree rotation;
(b) a device having only one moving part requiring no lubrication and is made without mechanical, metal or wooden parts;
(c) answers the problems described above as it more evenly disperses the pressure generated through the rod to the rod butt tip over a much wider, for example, a five inch (5") area or horizontal plain by the device 38 extending the cylindrical layout of the lower portion of the fishing rod 30 which locks into place providing a smoother rounded point of contact to the individual user to eliminate or make less likely bruising, sharp pain or injury produced underarm or laterally across the abdomen by dispersing the pressure/energy that is generated during a fish fight;
(d) may easily be adapted to any number of and or various shapes/sizes of containers, rods, or blanks while being fitted to either fresh or saltwater casting or spinning reel mounted or otherwise fishing rod, made from any of a number of materials known to one skilled in the art;
(e) is cheaper for the public to purchase, safer, has no sharp edges which are found in previous devices, provides a greater service life with little or no maintenance eliminating, as previously stated, positioning pins, levers, potentially rusting springs, screws, wedges or retainers, etc . . . ; and
(f) also, eliminates the need for a separate, uncomfortable fighting belt, oversized rod butt cushion or separate T brace that can be lost or become heavily soiled or otherwise distastefully unusable.

Thus, there has been provided Applicant's pressure dispersing apparatus and method of using the same. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A device for use with a fishing rod, comprising:
a tube having a proximal end and a distal end and defining a longitudinal plane between them;
a partial neck disposed along the tube and situated substantially perpendicular to the longitudinal plane of the tube;
a receptacle hole extending from the proximal end and into the tube;
a tang situated at the distal end of the tube, the tang providing a body having flat opposed sides and extending outwardly from substantially the center of the distal end and disposed with a tang hole between the flat opposed sides and within the body;
a first surface situated along the tube between the partial neck and the distal end, the first surface forming a convex surface and having a first receiving slot and a second receiving slot each located on opposite sides of the convex surface at a radius of 180 degrees or less from one another, each of the first receiving slot and the second receiving slot providing an interior recessed curved surface and extending parallel to the longitudinal plane from the partial neck to the distal end;
a foot defining an engagement end and a butt end and defining a second longitudinal plane between them;
the engagement end defining an interior surface and an exterior surface, the interior surface forming a concave surface and having a first exterior ridge and a second exterior ridge each located on opposite sides of the concave surface at substantially a radius of 180 degrees or less from one another, each of the first exterior ridge and the second exterior ridge extending parallel to the second longitudinal plane;
the first exterior ridge engaging with the first receiving slot and being received within the interior recessed curved surface of the first receiving slot and the second exterior ridge engaging with the second receiving slot and being received within the interior recessed curved surface of the second receiving slot to releaseably retain the interior surface of the engagement end of the foot to the first surface of the tube;
opposed holes situated between the interior surface and the exterior surface;
the flat opposed sides of the body of the tang inserted into the engagement end of the foot and within the interior surface with the tang hole being aligned between the opposed holes with a screw inserted through the entirety of one of the opposed holes, the tang hole, and the other opposed hole to secure the tube to the foot and define a pivot point;
the foot rotatable about the pivot point when the first exterior ridge and the second exterior ridge are disengaged from both the first receiving slot and the second receiving slot to release the engagement end of the foot from the tube.

2. The device of claim 1 wherein, when the interior surface of the engagement end of the foot is releaseably retained to the first surface of the tube, the device is in linear alignment with the fishing rod.

3. The device of claim 1 wherein, when the interior surface of the engagement end of the foot is released from the first surface of the tube, the foot can rotate up to ninety degrees in relation to the tube.

4. The device of claim 1 wherein the body of the tang has a curvilinear end.

5. The device of claim 4 wherein a notch is situated in the foot with the notch being substantially positioned along the foot in a location adjacent to the opposed holes.

6. The device of claim 5 wherein during rotation of the foot in relation to the tube about the pivot point, the curvilinear end of the body of the tang moves freely through the notch in the foot.

7. The device of claim 6 wherein a stop is provided in the butt end to engage the tube to prevent the foot from rotating greater than ninety degrees in relation to the tube.

8. The device of claim 1 and wherein the exterior surface of the engagement end provides a plurality of bars extending upwardly from the exterior surface of the engagement end to create a frictional surface, the plurality of bars each situated parallel to the second longitudinal plane.

9. The device of claim 1 wherein a rod blank of a fishing rod is fixedly received into and retained within the receptacle hole of the tube having a receptable hole diameter.

10. The device of claim 9 wherein the rod blank has an exterior with a first diameter that is covered with a section of tape that increases the first diameter of the exterior of the rod blank to a second diameter that is substantially the same as the receptacle hole diameter and a plurality of annulus sections situated on opposed sides of the section of tape.

11. The device of claim 10 wherein the plurality of annulus sections are covered with an adhesive material.

12. The device of claim 11 wherein the section of tape and the plurality of annulus sections covered with the adhesive material coact to fixedly retain the rod blank within the receptacle hole to secure the fishing rod to the device.

13. A device for use with a fishing rod comprising:
a tube having a proximal end and a distal end and defining a longitudinal plane between them;
a partial neck disposed along the tube and situated substantially perpendicular to the longitudinal plane of the tube;
a tang situated at the distal end of the tube, the tang providing a body having flat opposed sides and extending outwardly from substantially the center of the distal end and disposed with a tang hole between the flat opposed sides and within the body, the tang hole located along the longitudinal plane in substantially the center of the distal end;
a first surface situated along the tube between the partial neck and the distal end, the first surface forming a convex surface and having a first receiving slot and a second receiving slot each located on opposite sides of the convex surface at a radius of 180 degrees or less from one another, each of the first receiving slot and the second receiving slot providing an interior recessed curved surface and extending parallel to the longitudinal plane from the partial neck to the distal end;
a foot defining an engagement end and a butt end and defining a second longitudinal plane between them;
the engagement end defining an interior surface and an exterior surface, the interior surface forming a concave surface and having a first exterior ridge and a second exterior ridge each located on opposite sides of the concave surface at substantially a radius of 180 degrees or less from one another, each of the first exterior ridge and the second exterior ridge extending parallel to the second longitudinal plane;
the first exterior ridge engaging with the first receiving slot and being received within the interior recessed curved surface of the first receiving slot and the second exterior ridge engaging with the second receiving slot and being received within the interior recessed curved surface of the second receiving slot to releaseably retain the interior surface of the engagement end of the foot to the first surface of the tube;
opposed holes situated between the interior surface and the exterior surface;
the body of the tang inserted into the engagement end of the foot and within the interior surface with the tang hole being aligned between the opposed holes with a securing means inserted through the entirety of one of the opposed holes, the tang hole, and the other opposed hole to secure the tube to the foot and define a pivot point;
the foot rotatable about the pivot point when the first exterior ridge and the second exterior ridge are disengaged from both the first receiving slot and the second receiving slot to release the engagement end of the foot from the tube;
the exterior surface of the engagement end provides a plurality of bars extending upwardly from the exterior surface of the engagement end to create a frictional surface, the plurality of bars each situated parallel to the second longitudinal plane;
the body of the tang has a curvilinear end;
a notch is situated in the foot with the notch being substantially positioned along the foot in a location adjacent to the opposed holes and the tang;
wherein during rotation of the foot in relation to the tube about the pivot point, the curvilinear end of the body of the tang moves freely through the notch in the foot.

* * * * *